(12) United States Patent
Yamaura et al.

(10) Patent No.: US 11,971,366 B2
(45) Date of Patent: Apr. 30, 2024

(54) INSPECTION SYSTEM

(71) Applicant: Nagano Automation Co., Ltd., Nagano (JP)

(72) Inventors: Kenya Yamaura, Nagano (JP); Daichi Hasegawa, Nagano (JP)

(73) Assignee: Nagano Automation Co., Ltd., Nagano (JP)

( * ) Notice: Subject to any disclaimer, the term of this patent is extended or adjusted under 35 U.S.C. 154(b) by 311 days.

(21) Appl. No.: 17/609,808

(22) PCT Filed: May 20, 2020

(86) PCT No.: PCT/JP2020/019857
§ 371 (c)(1),
(2) Date: Nov. 9, 2021

(87) PCT Pub. No.: WO2020/235578
PCT Pub. Date: Nov. 26, 2020

(65) Prior Publication Data
US 2022/0252526 A1 Aug. 11, 2022

(30) Foreign Application Priority Data
May 23, 2019 (JP) .................................. 2019-097004

(51) Int. Cl.
*G01N 21/954* (2006.01)
*G01N 21/15* (2006.01)

(52) U.S. Cl.
CPC ........... *G01N 21/954* (2013.01); *G01N 21/15* (2013.01); *G01N 2021/151* (2013.01); *G01N 2021/9544* (2013.01); *G01N 2021/9546* (2013.01)

(58) Field of Classification Search
CPC ................. G01N 21/954; G01N 21/15; G01N 2021/151; G01N 2021/9544; G01N 2021/9546
See application file for complete search history.

(56) References Cited

U.S. PATENT DOCUMENTS 9,134,232 B1 9/2015 Segall
10,902,578 B2 * 1/2021 Kuwahara ................. G06T 7/11
(Continued)

FOREIGN PATENT DOCUMENTS

JP 2007-315798 A 12/2006
JP 2007-315821 A 12/2006
(Continued)

OTHER PUBLICATIONS

Extended European Search Report for EP 20810230, dated May 4, 2023, 9 pgs.
(Continued)

*Primary Examiner* — Hung V Nguyen
*Assistant Examiner* — Hung Henry Nguyen
(74) *Attorney, Agent, or Firm* — Blank Rome LLP

(57) ABSTRACT

An inspection system (1) includes: a probe (12) that is hollow, extends in a rod shape along a center axis (11), and rotates around the center axis; an optical system (30) that, through the probe, supplies laser light for inspection purposes along the center axis and receives reflected light from a surface of an inspection target that has returned along the center axis; an optical element (50) that, through an opening at a front end of the probe, emits the laser light for inspection purposes toward the inspection target with respect to the center axis and guides the reflected light in the direction of the center axis; and a gas supplying system (80) that discharges gas (89) from the opening through the probe.

4 Claims, 4 Drawing Sheets

(56) References Cited

U.S. PATENT DOCUMENTS

| | | | |
|---|---|---|---|
| 2007/0132990 A1 | 6/2007 | Fukami et al. | |
| 2009/0262354 A1 | 10/2009 | Horiuchi et al. | |
| 2011/0080588 A1 | 4/2011 | Segall | |
| 2013/0093876 A1 | 4/2013 | Ishizuka et al. | |
| 2018/0356288 A1* | 12/2018 | Segall ................... | G01J 5/0066 |

FOREIGN PATENT DOCUMENTS

| | | |
|---|---|---|
| JP | 2013-088136 A | 5/2013 |
| JP | 2007-147324 A | 6/2014 |
| WO | WO-2019/083009 A1 | 5/2019 |
| WO | WO-2019/083010 A1 | 5/2019 |

OTHER PUBLICATIONS

International Search Report for PCT/JP2020/019857, dated Aug. 25, 2020, 2 pgs.
International Preliminary Examination Report for PCT/JP2020/019857, dated Jan. 19, 2021, 3 pgs.

* cited by examiner

INSPECTION SYSTEM

RELATED APPLICATIONS

This application is a national phase of PCT/JP2020/019857, filed on May 20, 2020, which claims priority to Japanese Patent Application No. 2019-097004, filed on May 23, 2019. The entire contents of these applications are hereby incorporated by reference.

TECHNICAL FIELD

The present invention relates to an inspection system where an inspection head irradiates laser light for inspection purposes on an inspection target to inspect a surface thereof.

BACKGROUND ART

Japanese Laid-open Patent Publication No. 2007-315821 discloses a surface inspection apparatus where a rod-shaped inspection head, which has a mirror provided at the front end, is moved along an axis while being rotated about the axis by a driving mechanism, the optical path of inspection light that is incident along the axis inside the inspection head is changed by the mirror, the inspection light whose optical path has changed is irradiated onto an inspection target, and the surface condition of the inspection target is detected based on the amount of inspection light that has been reflected by the inspection target and re-entered the inspection head. The inspection head includes a body of the head that is attached to the driving mechanism and a holder portion that holds the mirror and is provided so as to be detachably attached to the body of the head.

SUMMARY OF INVENTION

For an inspection head with a hollow probe, it has been pointed out that dirt may adhere to an optical system of the inspection head, causing a decrease in inspection accuracy and a further problem of the time required to remove the dirt, which may hold up or interfere with surface inspections of objects to be inspected (hereinafter "inspection targets").

One aspect of the present invention is an inspection system including: a probe that is hollow, extends in a rod-like shape along a center axis so as to be able to rotate about the center axis; an optical system that, through the probe, supplies laser light for inspection purposes along the center axis and receives reflected light from a surface of an inspection target that has returned along the center axis; an optical element that, through an opening at the front end of the probe, emits the laser light for inspection purposes toward the inspection target with respect to the center axis and guides the reflected light in a direction of the center axis; and a gas supplying system that discharges gas from the opening through the probe. By supplying or feeding gas, such as air, to the inside of the probe provided with an opening at the front end (tip end) and discharging the gas from the opening, it is possible to suppress contamination of the optical element provided at the front end of the probe. It is also possible to thoroughly prevent contamination of the optical system through the probe. Accordingly, it is possible to protect the inspection system from causes of contamination, such as dust present on the inspection target or a surface being inspected. This makes it possible for the inspection system to inspect the surface to be inspected accurately and stably.

The inspection system may further include: a holder that supports the probe and is rotationally driven; an inner cylinder portion (inner cylinder) that is hollow and coaxially provided inside the holder with a bearing unit between the holder and the inner cylinder portion; and an optical fiber (or optical fiber bundle) that does not rotate and is inserted into the probe through the inner cylinder portion. The gas supplying system may include a gas feeding path that extends so as to feed the fluid through the inner cylinder portion inside the probe while avoiding interference with the bearing unit.

The inspection system may include: a sheath tube that is cylindrical, covers the optical fiber, and is connected to the inner cylinder portion via a sleeve; and a lens attached to a front end (tip end) of the sheath tube. The gas supplying path may include a connecting path that is produced by cutting out a part or parts of the sleeve and connects an inside of the inner cylinder portion and a region that is outside the sheath tube and inside the probe.

The inspection system may include a driving unit, for example, a motor, that rotates an inspection head including the probe about (around) the center axis. The inspection target may include a hollow part into which the probe is inserted, and the inspection system may further include a moving unit that relatively moves the probe and the inspection target along the center axis.

BRIEF DESCRIPTION OF DRAWINGS

FIG. 3(a) depicts the main component elements using hatching and FIG. 3(b) depicts the paths of purging air using hatching.

DESCRIPTION OF EMBODIMENTS

Figure 1:
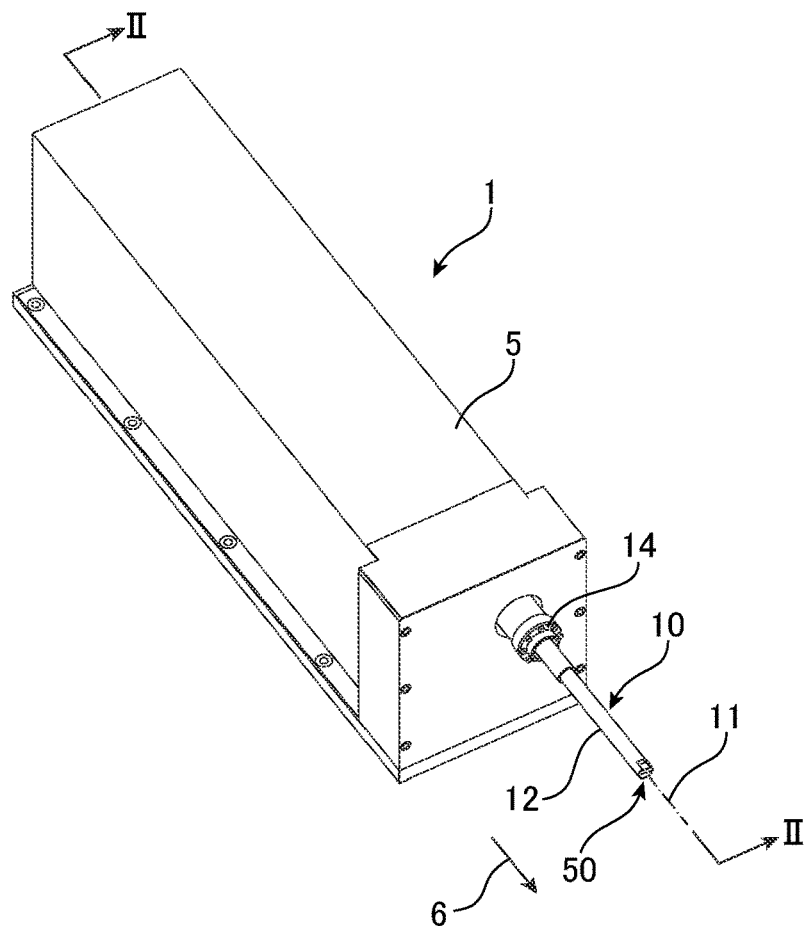
FIG. 1 is a perspective view depicting an overview of an inspection apparatus.
Figure 2:
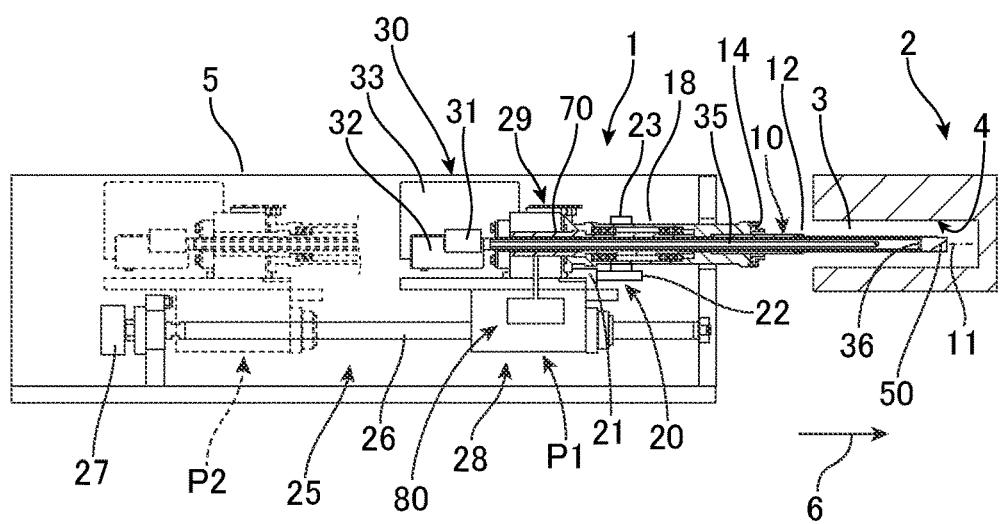
FIG. 2 is a cross-sectional view depicting the overall configuration of the inspection apparatus (a cross-sectional view along a line II-II).

FIG. 1 depicts the exterior view of an inspection apparatus (inspection system) 1 and FIG. 2 depicts the overall configuration of the inspection apparatus 1 by way of a cross section. This inspection apparatus (surface inspection apparatus) 1 is suited to inspecting the shape or state of an inner surface 4 of a hollow part 3, such as a hole or a concave, provided in an inspection target 2.

The inspection apparatus 1 includes: an inspection head 10 that is hollow and extends along a center axis 11 in a rod or rod-like shape; a driving unit (rotating unit, rotating device) 20 that rotates the inspection head 10 around (about) the center axis 11; an optical system 30 that, through the inside of the inspection head 10, supplies laser light for inspection purposes (inspection laser light, inspection laser beam) along the center axis 11 and receives reflected light from the surface 4 of the inspection target 2 that has returned along the center axis 11; a moving unit (moving device) 25 that relatively moves the inspection head 10 and the inspection target 2 along the center axis 11; and a housing 5 that internally houses the rotating unit 20, the optical system 30, and the moving unit 25.

The inspection apparatus 1 includes the moving unit 25 that moves the inspection head 10 relative to the inspection target 2. The moving unit 25 in the present embodiment includes: a carriage 28 on which the inspection head 10, the rotating unit 20, and the optical system 30 are mounted; and a combination of a ball screw 26 and a motor 27 for actuating the movement. The combination of the ball screw 26 and the motor 27 moves the carriage 28 forward and backward (that is, left and right in FIG. 2). The above configuration of the moving unit 25 is merely one example, and a slider, a moving table, or the like may be used, By using the moving unit 25, the inspection head 10 moves to a position P1 where the inspection head 10 protrudes forward from the housing 5 and a position P2 where the inspection head 10 is retracted inside the housing 5. In place of moving the inspection head 10 forward and backward, or together with moving the inspection head 10 forward and backward, the inspection target 2 may be moved using a robot or the like.

The inspection apparatus 1 has a support unit 70 that is fixed on the carriage 28 of the moving unit 25 and supports the inspection head 10 from the inside. The inspection head 10 includes a holder 18, which is mounted so as to rotate with respect to the support unit 70 that is fixed, and a hollow probe 12, which protrudes from the holder 18 to the front 6 along the center axis (rotation axis or axis) 11.

One example of the rotating unit 20 that rotationally drives the holder 18 is a motor 21 that is mounted on the carriage 28. A pulley 22 driven by the motor 21 is connected to the holder 18, which is the rotating portion of the inspection head 10, by a drive belt (timing belt) 23, The motor 21 rotates the holder 18 of the inspection head 10 via the drive belt 23 at high speed around (about) the center axis 11 (that is, with the center axis 11 as the center of rotation). This results in the probe 12 that is fixed to the holder 18 also rotating at high speed, for example, 2000 rpm.

The optical system 30 includes a semiconductor laser (laser diode (LD)) 31 that generates laser light for inspection purposes (inspection laser light, inspection laser beam), a light receiving element (as examples, a photodiode, a CCD, or a CMOS) 32 that receives reflected light, and a control unit 33 that may include circuits such as a driving circuit for the semiconductor laser 31 and a circuit for processing a signal received by the light receiving element 32. The signal received by the optical system 30 is sent to a computer (personal computer), not illustrated, via the control unit 33, is subjected to further data processing, and is used for analysis of the surface 4 of the inspection target 2. The optical system 30 further includes optical fiber 35 inserted inside the probe 12.

The inspection apparatus 1 further includes a gas supplying system (air supplying system, air feeding system) 80 that supplies or feeds air as a gas to the inside of the probe 12 through the support unit 70 that is fixed to the carriage 28. The air source may be compressed air used for control at a factory, or an air source for generating compressed air, such as an air cylinder or a compressor, may be provided in the vicinity of the inspection apparatus 1. It is desirable for the air supplied by the air supplying system 80 to be air with few impurities, where oil, moisture, and the like have been removed by a filter and/or a dryer. The gas supplied by the gas supplying system 80 may be an inert gas, such as nitrogen or argon.

Figure 3:
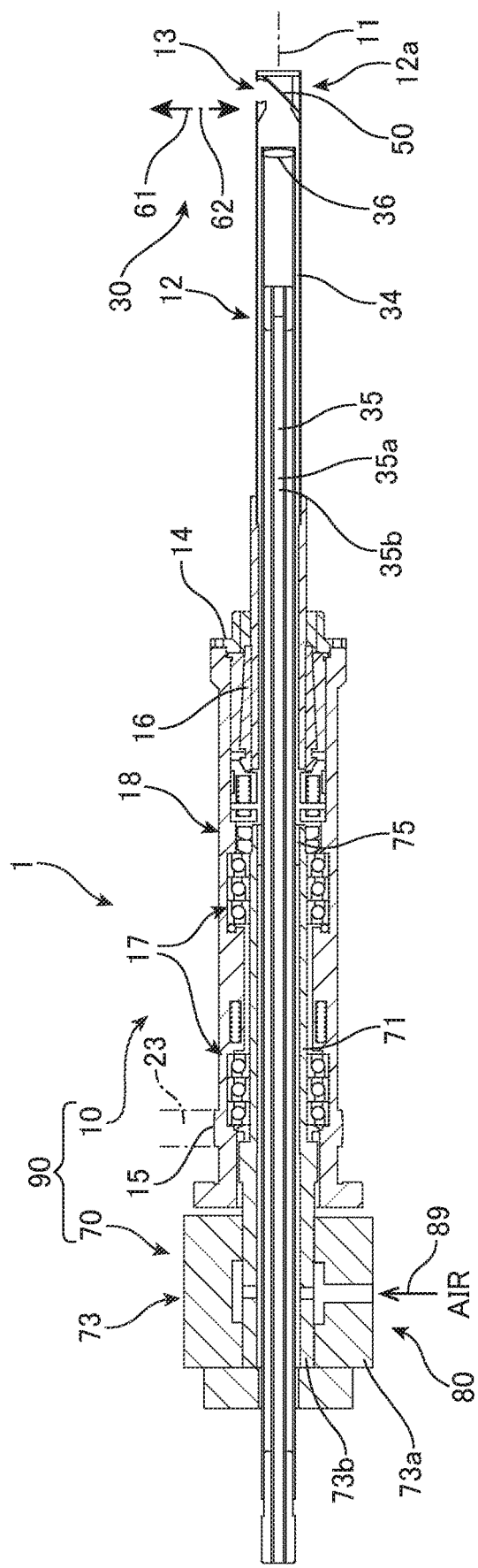
FIG. 3 is a cross-sectional view depicting the overall configuration of an inspection head, where
Figure 3:
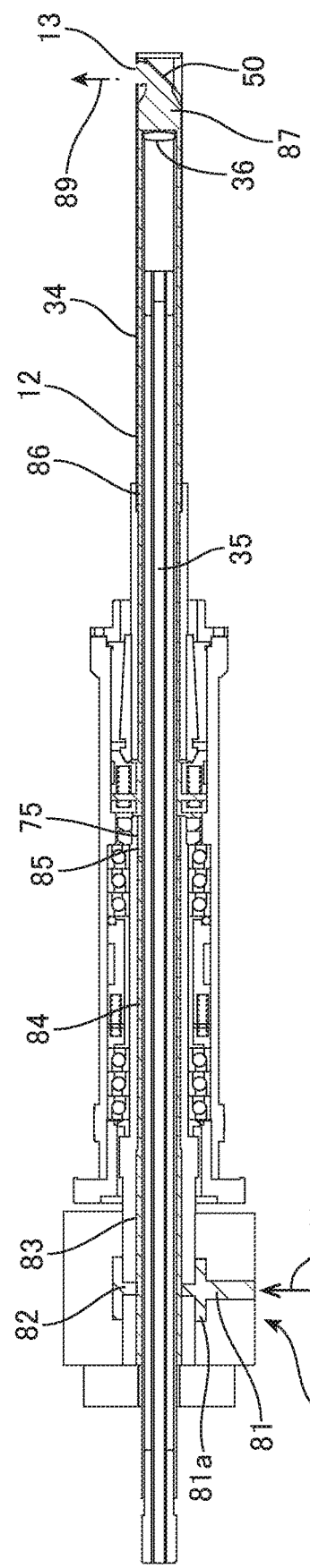
Figure 4:
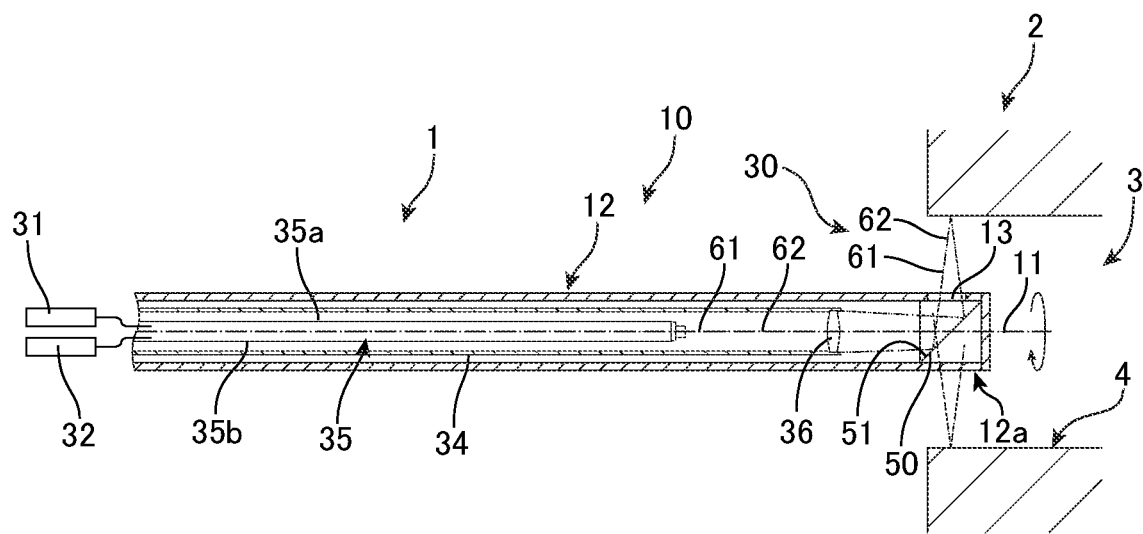
FIG. 4 is a cross-sectional view depicting an enlargement of the configuration at the front end of the inspection head depicted in FIG. 3.

FIG. 3 depicts, by way of a cross section, the overall configuration of a combination 90 composed of the inspection head 10 and the support unit 70 that supports the inspection head 10 that have been extracted from the inspection apparatus 1. FIG. 3(a) depicts the internal structure by way of a cross section, and FIG. 3(b) depicts gas supplying paths (air supplying paths, air feeding paths) 81 to 87 for supplying air 89 as a gas using hatching. FIG. 4 depicts the configuration of the probe 12 at the front end (tip end) of the inspection head 10 by way of an enlarged cross-section.

The inspection head 10 has the overall form of a hollow cylinder that extends along the rotation axis 11, and is coaxially attached to the non-rotating support unit 70 as a base portion so as to rotate via bearing units 17. The inspection head 10 includes a cylindrical holder (holder portion or rotating portion) 18, which is attached to the outside of a non-rotating inner cylinder portion 71 of the support unit 70 so as to rotate via the bearing units 17, and the probe (insertion portion or needle portion) 12 that is hollow, is supported by the holder 18, and extends from the holder 18 along the center axis 11 toward the front end (front). The support unit 70 that supports the inspection head 10 includes the inner cylinder portion 71, which is hollow, coaxially provided inside the holder 18, and has the bearing units 17 disposed between the inner cylinder portion 71 and the holder 18, and a support cylinder 73, which is hollow and is connected to a base end (the opposite end to the probe 12) of the inner cylinder portion 71.

The holder 18 includes a driven portion 15, which is relatively thick and receives a rotational force transmitted via the drive belt 23, a connecting portion (collet) 16 that supports the probe 12 that has extended forward, and a flange portion 14 that presses the collet 16. The inspection head 10 has an opening (cutaway) 13 that faces in the radial direction and is positioned at the front end 12a of the probe 12 that has extended (forward) from the center of the flange portion 14 of the holder 18 toward the front end. The optical system 30 is configured to, through the opening 13 provided at the front end 12a of the probe 12, emit laser light (probe light, probe beam) 61 for inspection purposes toward the surface 4 of the hollow part 3 of the inspection target 2 and receive (return) the reflected light 62 from the surface 4 of the inspection target 2 to return to the inspection head 10 through the probe 12.

The optical fiber (optical fiber bundle) 35 that guides the probe light 61 and the reflected light 62 along the center axis 11 is inserted inside the inspection head 10, The optical fiber bundle 35 is a plurality of fibers in a bundle, and may include light projecting fibers 35a that guide the probe light 61 emitted from the LD31 toward the inspection target 2 and light receiving fibers 35b that guide the reflected light 62 from the inspection target 2 toward the light receiving element 32.

In addition, the inspection apparatus 1 includes a sheath tube with a cylindrical-like shape (holding cylinder) 34 that holds the optical fibers 35 in a bundled state inside the inspection head 10, A lens 36 is attached to the front end of the sheath tube 34. The sheath tube 34 does not rotate, passes through the probe 12 and the inside of the holder 18, which are rotating parts, along the center axis 11, and is connected via a sleeve bearing 75 to the inner cylinder portion 71 of the support unit 70, which does not rotate. The optical fibers 35 are further connected through the inner cylinder portion 71 and the support cylinder 73 to the semiconductor laser 31 and the light receiving element 32 at the rear. Accordingly, in this inspection head 10, by rotating the inspection head 10 on the outside without the sheath tube 34 and the optical fiber 35 rotating, the inspection light 61 is emitted via the optical element 50 at the front end 12a of the probe 12 toward the surface of the hollow part 3 and rotates around the surface.

The probe 12 extends forward from the flange portion 14 of the holder 18 along the center axis 11, and an optical element 50 for controlling the emitted direction of the probe light 61 is attached to the front end (or the vicinity of the front end) 12a. The optical element 50 is a plane mirror as one example, but may be another optical element, such as a prism, with a reflecting surface or a refracting surface capable of controlling the emitted direction and the incident direction of light. In the inspection apparatus 1 according to the present embodiment, the angle of the mirror surface (or reflecting surface) 51 of the optical element 50 is set at 45 degrees, so that the probe light 61 emitted from the optical fiber 35 with the center axis 11 as the optical axis is emitted or irradiated in a direction that is perpendicular to the center axis (optical axis) 11. The mirror surface 51 of the optical element 50 also reflects light (reflected light) 62 that has been reflected from the inner surface 4 of the inspection target in the direction of the optical fiber 35 on the center axis 11.

One example of the lens 36 attached to the front end of the sheath tube 34 is an objective lens (photochromatic lens) with a focal length suited to collecting the probe light 61 outputted from the front end of the optical fiber 35 onto the surface 4 of the inspection target via the reflecting surface 51. The photochromic lens 36 also has a function of collecting the reflected light 62, which has been introduced into the inspection head 10 via the reflecting surface 51, onto the front end of the optical fiber 35. The optical system 30 that supplies the probe light 61 along the center axis 11 of the inspection head 10 and detects the reflected light 62 is not limited to a system that uses the optical fiber 35, and may be another optical system that is equipped with a dichroic prism or the like and is known by names such as "optical pickup".

The inspection apparatus 1 further includes a gas supplying system 80 that supplies or feeds the purging gas, typically air 89, inside the probe 12. The gas supplying paths (air supplying paths, air feeding paths) 81 to 87 that construct the gas supplying system (air supplying system, air feeding system) 80 are illustrated using hatching in FIG. 3(b). The air supplying system 80 includes a first supplying path (feeding path) 81 that passes through an outer block 73a of the support cylinder portion (support cylinder) 73 of the support unit 70 that is fixed, a buffer region 81a formed between the first supplying path 81 and a hollow inner block 73b of the support cylinder portion 73, and a second supplying path (feeding path) 82 that passes through the inner block 73b and connects the buffer region 81a and the inside of the inner block 73b, that is, the inside of the support cylinder portion 73. The air 89 that has been supplied to the inside of the support cylinder portion 73 (that is, to the inside of the inner block 73b) by the supplying paths 81 and 82 flows through gaps between the optical fiber 35 and the inside of the support cylinder 73 as the third supplying path (feeding path) 83, and then flows through gaps between the optical fiber 35 and the inside of the inner cylinder portion 71 of the support unit 70 as the fourth supplying path (feeding path) 84.

Figure 5:
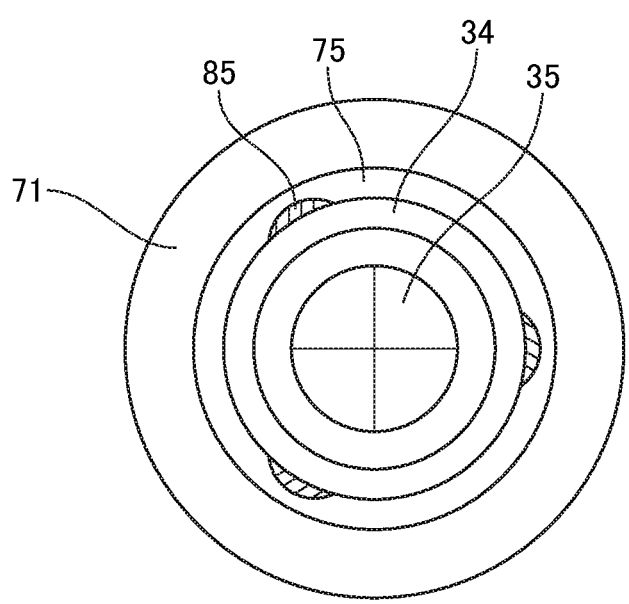
FIG. 5 depicts a feeding path that passes through a sleeve.

As depicted in FIG. 5, the air supplying system 80 further includes a connection path (fifth supplying path, fifth feeding path) 85 that connects the flow path 84 inside the inner cylinder 71 and a region 86 that is outside the sheath tube 34 and inside the probe 12. The connecting path 85 is formed by cutting out parts of the sleeve 75 that connects the inner cylinder portion 71 of the support unit 70 and the sheath tube 34. This means that the purging air 89 is supplied from the fourth supplying path 84 inside the inner cylinder portion (inner cylinder) 71 through the connection path 85 to the sixth supplying path (feeding path) 86 inside the probe 12. Although the connection path 85 in FIG. 5 is formed by cutting out the inside of the sleeve 75, it is also possible to form the connection path 85 by cutting out the outside of the sleeve 75 or by cutting out the inside of the inner cylinder portion 71 at the boundary with the sleeve 75.

Inside the probe 12, the purging air 89 flows through the flow path (sixth supplying path) 86 on the outside of the sheath tube 34, and is supplied to a space (the seventh supplying path, seventh feeding path) 87 in front of (at the front end of) the photochromic lens 36 attached to the front end of the sheath tube 34, The purging air 89 is then discharged to the outside through (from) the opening 13 at the front end of the probe 12. By supplying the purging air 89 to the probe 12, it is possible to suppress contamination of the optical element 50, the lens 36, the optical fiber 35, and the like installed inside the probe 12 by dust or the like that has entered through the opening 13, which would cause a decrease in optical performance, Although it is possible to cover the opening 13 with a translucent material to prevent the ingress of contaminants, there is a high probability of the translucent material itself covering the opening 13 becoming dirty and causing deterioration in optical performance. There is also the possibility of the translucent material causing problems such as refraction of light, which may cause a drop in the accuracy of the inspection apparatus 1 if the rotational speed of the probe 12 is increased to shorten the surface inspection time.

By supplying the purging air 89 to the inside of the probe 12 and discharging the air through the opening 13 which is uncovered, it is possible to suppress deterioration in the optical performance due to the opening 13 being covered. It is also possible to purge or prevent ingress of impurities into the inside of the probe 12 from the opening 13. Also, by providing the flow of air 89 in the probe 12, it is possible to suppress the adhesion of dirt to the optical elements inside the probe 12. This means that the rotational speed of the probe 12 can be increased to shorten the time taken by surface inspections. Since it is also possible to omit or reduce the time required for cleaning the optical elements installed inside the probe 12, it is possible to reduce the frequency of maintenance and perform surface inspections more efficiently.

The inspection head 10 including the probe 12 is rotatably attached via the bearing unit 17 to the outside of the support unit 70, which includes the inner cylinder portion 71 and is fixed (dose not rotate). This means that from the support unit 70, which is fixed on the inside, to the supplying path 86 inside the probe 12, it is possible to arrange the supplying paths 81 to 85 of the purging air 89 in the support cylinder 73 and the inner cylinder portion 71. Accordingly, it is possible to provide an air supplying system 80 that has a simple configuration where the purging air 89 is introduced into the inside of the probe 12 of the inspection head 10 through the support unit 70 that is fixed.

In addition, inside the probe 12, the supplying path 86 is provided outside the sheath tube 34 that houses the optical fiber 35, and the lens 36 is installed at the front end of the sheath tube 34 as a separated component to the probe 12 inside the probe 12. This means that the path of the purging air 89 is not blocked by the lens 36 inside the probe 12 to purge, so that it is possible to cover the optical system 30 including surfaces of the lens 36 exposed to the inside of the probe 12 with the purging air 89 to suppress contamination of the optical system 30, especially parts of the optical system 30 installed inside the probe 12 that inputs and outputs light.

The inspection system described above includes an inspection head, which is hollow, extends in a rod-like shape along a center axis, and rotates around the center axis, and an optical system, which both supplies laser light for inspection purposes (inspection laser light) along the center axis and receives light that has been reflected from the surface of an inspection target and returned along the center axis, through the inside of the inspection head. The inspection head includes: a holder that is rotationally driven; a hollow probe that extends from the holder along the center axis; and an optical element that is disposed at the front end of the probe, and both emits the laser light for inspection purposes toward the inspection target relative to the center axis and guides the reflected light in the direction of the center axis, through an opening at the front end of the probe. The inspection system further includes an air supplying system that supplies air to the inside of the probe and discharges or purges the air from the opening.

The inspection system further includes a support unit that does not rotate and supports the inspection head from the inside. The support unit includes: an inner cylinder portion that is hollow and provided coaxially inside the holder, with a bearing unit disposed between the holder and the inner cylinder portion; and a support cylinder that is hollow and is connected to a base of the inner cylinder portion. The optical system includes an optical fiber bundle that does not rotate and is a bundle of optical fiber that is inserted into the probe through the support cylinder and the inner cylinder portion. The air supplying system (air feeding system) may include an air feeding path that extends so as to allow fluid to pass inside the probe through the support cylinder and the inner cylinder portion.

The inspection system may further include: a sheath tube that is cylindrical, covers the optical fiber bundle, and is connected via a sleeve to the inner cylinder portion; and a photochromatic lens attached to a front end of the sheath tube. The air supplying path may include a connecting path that is produced by cutting out one or more parts of the sleeve and connects an inside of the inner cylinder portion and a region that is outside the sheath tube and inside of the probe. The inspection system may further include a rotating unit that rotates the inspection head around (about) the center axis. The inspection target may include a hollow part into which the probe is inserted, and the inspection system may further include a moving unit that relatively moves the inspection head and the inspection target along the center axis.

Although specific embodiments of the present invention have been described above, various other embodiments and modifications will be conceivable to those of skill in the art without departing from the scope and spirit of the invention. Such other embodiments and modifications are addressed by the scope of the patent claims given below, and the present invention is defined by the scope of these patent claims.

The invention claimed is:

1. An inspection system comprising:
    a probe that is hollow, extends in a rod-like shape along a center axis so as to be able to rotate about the center axis;
    an optical system that, through the probe, supplies laser light for inspection purposes along the center axis and receives reflected light from a surface of an inspection target that has returned along the center axis;
    an optical element that, through an opening at a front end of the probe, emits the laser light for inspection purposes toward the inspection target with respect to the center axis and guides the reflected light in a direction of the center axis;
    a gas supplying system that supplies gas through an inside of the probe and discharges the gas from the opening, through which the laser light is emitted and the reflected light is guided;
    a holder that supports the probe and is rotationally driven;
    an inner cylinder portion that is hollow and does not rotate, the inner cylinder portion being coaxially provided inside the holder with a bearing unit between the holder and the inner cylinder portion; and
    an optical fiber that does not rotate and is inserted into the probe through the inner cylinder portion,
    wherein the gas supplying system includes a gas feeding path that feeds the gas inside the probe through the inner cylinder portion.

2. The inspection system according to claim 1, further comprising:
    a sheath tube that is cylindrical, covers the optical fiber, and is connected to the inner cylinder portion via a sleeve; and
    a lens attached to a front end of the sheath tube,
    wherein the gas supplying path includes a connecting path that is provided by cutting out part of the sleeve and connects an inside of the inner cylinder portion and a region that is outside the sheath tube and inside the probe.

3. The inspection system according to claim 1, further comprising a driving unit that rotates an inspection head including the probe about the center axis.

4. The inspection system according to claim 1,
    wherein the inspection target includes a hollow part into which the probe is inserted, and
    the inspection system further includes a moving unit that relatively moves at least one of the probe and the inspection target along the center axis.

* * * * *